US008147012B2

(12) United States Patent
Green

(10) Patent No.: US 8,147,012 B2
(45) Date of Patent: Apr. 3, 2012

(54) INTERLOCKING CONNECTOR STRIP FOR ASSEMBLING DRAWERS

(75) Inventor: John M. Green, East Otto, NY (US)

(73) Assignee: Bush Industries, Inc., Jamestown, NY (US)

(*) Notice: Subject to any disclaimer, the term of this patent is extended or adjusted under 35 U.S.C. 154(b) by 577 days.

(21) Appl. No.: 12/209,680

(22) Filed: Sep. 12, 2008

(65) Prior Publication Data

US 2009/0072691 A1    Mar. 19, 2009

Related U.S. Application Data

(60) Provisional application No. 60/993,648, filed on Sep. 13, 2007.

(51) Int. Cl.
*A47B 43/00* (2006.01)

(52) U.S. Cl. .................. 312/348.2; 312/265.5

(58) Field of Classification Search ............... 312/348.2, 312/348.4, 348.1, 348.6, 265.5, 265.6, 257.1, 312/330.1, 263, 258; 220/4.34, 4.31, 4.33; 403/364

See application file for complete search history.

(56) References Cited

U.S. PATENT DOCUMENTS

| | | | | | |
|---|---|---|---|---|---|
| 224,066 | A | * | 2/1880 | Armstrong | 217/11 |
| 436,149 | A | * | 9/1890 | Overgaard | 217/12 R |
| 695,677 | A | * | 3/1902 | Faris | 217/65 |
| 1,648,591 | A | * | 11/1927 | Repay | 217/65 |
| 1,822,448 | A | * | 9/1931 | Morin | 312/258 |
| 2,919,045 | A | * | 12/1959 | Waugh et al. | 220/4.34 |
| 3,040,848 | A | * | 6/1962 | Powell et al. | 52/797.1 |
| 3,405,835 | A | * | 10/1968 | Eby | 220/4.34 |
| 3,639,027 | A | * | 2/1972 | Higdon, Jr. | 312/348.1 |
| 4,098,199 | A | * | 7/1978 | Haje | 109/52 |
| 4,128,284 | A | * | 12/1978 | King | 312/348.2 |
| 4,191,439 | A | * | 3/1980 | Cohen | 312/348.2 |
| 4,300,695 | A | * | 11/1981 | Hsu | 220/6 |
| D304,689 | S | * | 11/1989 | Dixon | D3/272 |
| 5,641,240 | A | * | 6/1997 | Grieser et al. | 403/403 |
| 7,770,340 | B2 | * | 8/2010 | Heady et al. | 52/107 |
| 2005/0212391 | A1 | * | 9/2005 | Chuan | 312/348.2 |
| 2008/0246376 | A1 | * | 10/2008 | Krieger | 312/257.1 |

* cited by examiner

*Primary Examiner* — Janet M Wilkens
(74) *Attorney, Agent, or Firm* — The Webb Law Firm

(57) ABSTRACT

A connector strip comprising a first mounting plate having spaced apart first projections with first pockets between adjacent projections, a second mounting plate having at least one second projection with second pockets between each adjacent second projection, wherein the first projections and the first pockets slidingly interlock with each second projection and the second pockets to form a joint, and at least one fastener laterally securing together the interlocking projections and pockets.

23 Claims, 10 Drawing Sheets

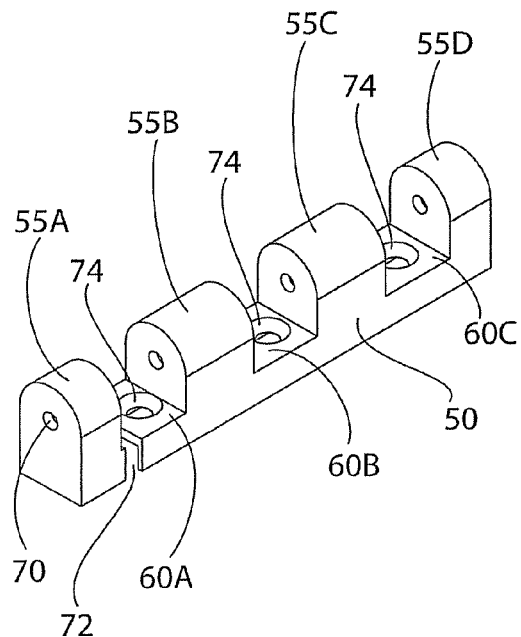
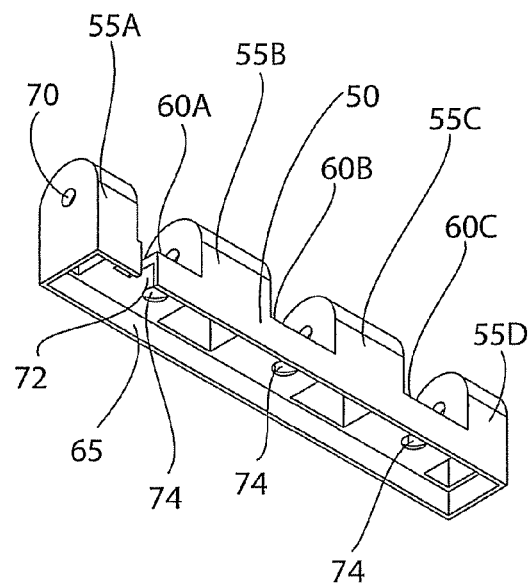
FIG. 4          FIG. 5
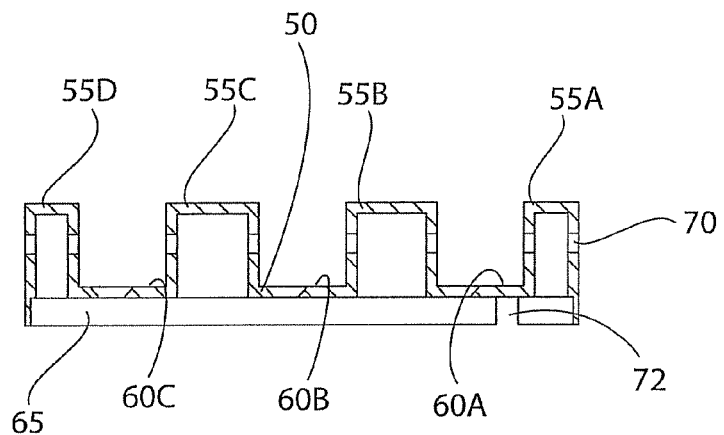
FIG. 6

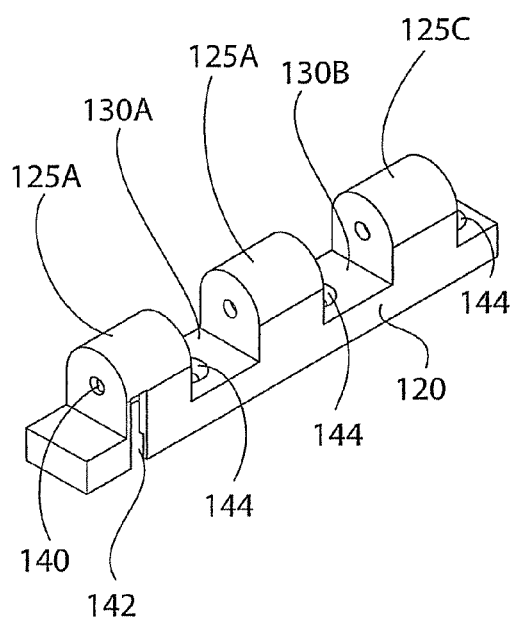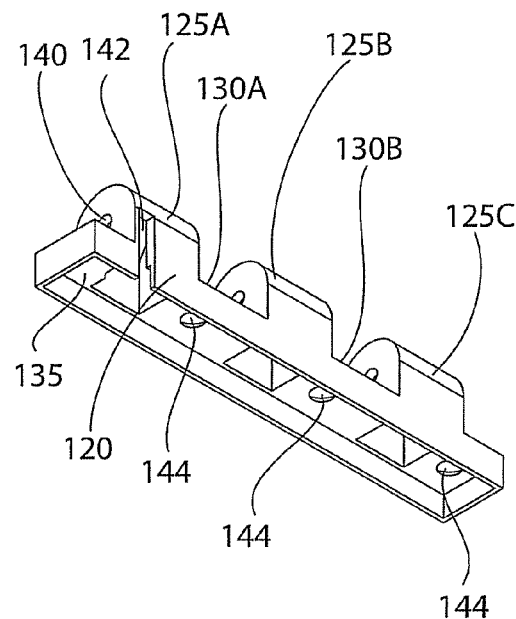
FIG. 7  FIG. 8
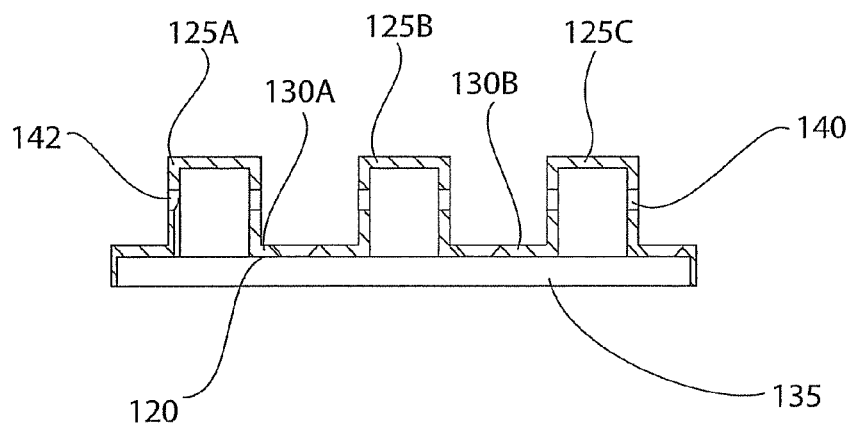
FIG. 9

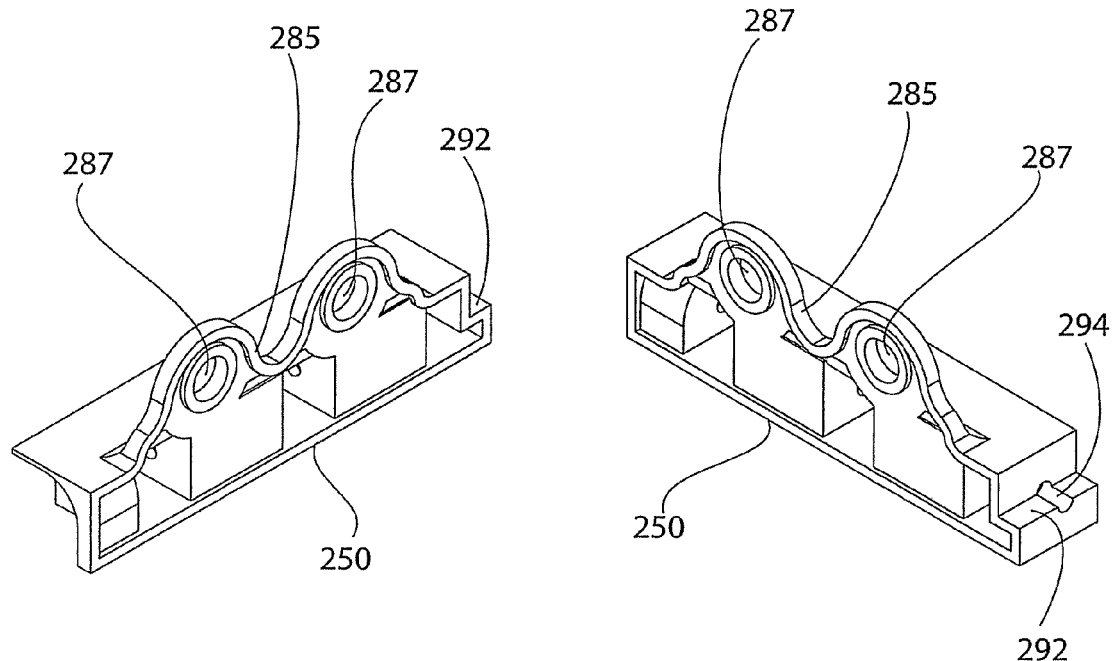
FIG. 18   FIG. 19
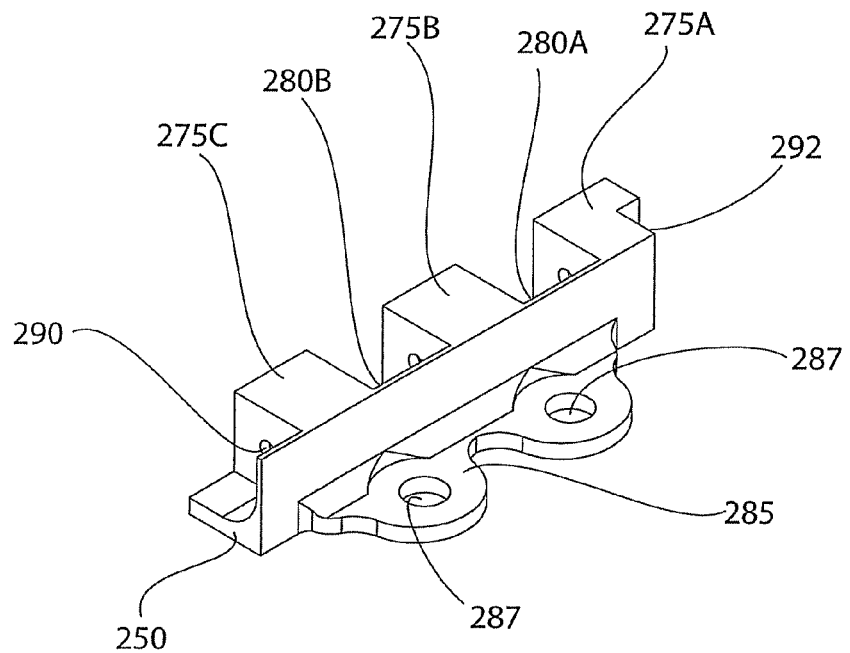
FIG. 20

INTERLOCKING CONNECTOR STRIP FOR ASSEMBLING DRAWERS

CROSS REFERENCE TO RELATED APPLICATIONS

This application claims the benefit of U.S. Provisional Application No. 60/993,648, filed Sep. 13, 2007, the entire contents of which are hereby incorporated by reference.

BACKGROUND OF THE INVENTION

1. Field of the Invention

The invention is directed to a mechanical connector and, more particularly, to a connector strip used to connect the corners of parts of a drawer.

2. Description of Related Art

Ready-To-Assemble (RTA) furniture is packed and sold in boxes, wherein the parts of the furniture are disassembled as much as possible to provide a compact package but, at the same time, provide an arrangement whereby the purchaser may assemble, with relative ease, the parts of the furniture.

A device is needed for assembling the drawers of RTA furniture, whereby the parts may be fully disassembled and packed within a box while, at the same time, may be easily assembled to provide a furniture piece having high structural integrity.

SUMMARY OF THE INVENTION

The present invention is directed to a connector strip comprising a first mounting plate having spaced apart first projections with first pockets between adjacent projections and a second mounting plate having at least one second projection with second pockets between each adjacent second projection. The first projections and the first pockets slidingly interlock with each second projection and the second pockets to form a joint. At least one fastener laterally secures together the interlocking projections and pockets. The first projection and each second projection may have a bore extending therethrough in a longitudinal direction. The at least one fastener may extend through the bore of the first projections and the bore of each second projection. Further, the first mounting plate and the second mounting plate may each have a plurality of mounting holes extending therethrough.

In one embodiment, a drawer assembly is provided. The drawer assembly comprises a front panel having a rear face, a rear panel having a first end and a second end, a left panel having a first end and a second end, a right panel having a first end and a second end, and a bottom panel. The drawer assembly further comprises a first connector strip securing the first end of the rear panel to the second end of the left panel, a second connector strip securing the second end of the rear panel to the second end of the right panel, a third connector strip securing the first end of the left panel to the rear face of the front panel, and a fourth connector strip securing the first end of the right panel to the rear face of the front panel. Each connector strip comprises a first mounting plate having spaced apart first projections with first pockets between adjacent projections, and a second mounting plate having at least one second projection with second pockets between each adjacent second projection. The first projections and the first pockets slidingly interlock with each second projection and the second pockets to form a joint. At least one fastener laterally secures together the interlocking projections and pockets.

Further, at least one of the first mounting plate and the second mounting plate of each connector strip may have a receiving portion located on a side opposite the first projections and each second projection. The receiving portion is configured to receive the first end and the second end of the left panel, the right panel and the rear panel, respectively. Each connector strip may further include a groove corresponding to the respective mounting grooves of the front panel, rear panel, left panel and right panel. The groove of each connector strip is configured to support the circumferential edge of the bottom panel. The first mounting plate and the second mounting plate of each connector strip may also have a plurality of mounting holes extending therethrough. A plurality of fasteners may be positioned through the mounting holes to secure the first mounting plate and the second mounting plate of each connector strip to the front panel, rear panel, left panel, and right panel, respectively.

In a further embodiment, a method of assembling a drawer is provided. The method of assembling a drawer comprises the step of providing a front panel having a rear face, a rear panel having a first end and a second end, a left panel having a first end and a second end, a right panel having a first end and a second end, and a bottom panel. The method further includes the step of securing the first end and the second end of the rear panel to the second end of the left panel and the second end of the right panel, respectively, via first and second connector strips. The method also includes the step of securing the first end of the left panel and the first end of the right panel to the rear face of the front panel via third and fourth connector strips. The method may further include the step of positioning the circumferential edge of the bottom panel into mounting grooves of the front panel, rear panel, left panel and right panel and the respective grooves of each connector strip. The method may also include the step of securing the first mounting plate and the second mounting plate of each connector strip to the front panel, rear panel, left panel and right panel, respectively, via a plurality of fasteners inserted through the mounting holes.

BRIEF DESCRIPTION OF THE DRAWINGS

FIG. 4 is a top left-side perspective view of a second mounting plate according to one embodiment of the present invention;

FIG. 5 is a bottom left-side perspective view of the plate shown in FIG. 4;

FIG. 6 is a right-side cross-sectional view of the plate shown in FIG. 4;

FIG. 7 is a top left-side perspective view of a first mounting plate according to a further embodiment of the present invention;

FIG. 8 is a bottom left-side perspective view of the plate shown in FIG. 7;

FIG. 9 is a left-side cross-sectional view of the plate shown in FIG. 7;

FIG. 18 is a front left-side perspective view of a second mounting plate according to yet another embodiment of the present invention;

FIG. 19 is a rear left-side perspective view of the plate shown in FIG. 18;

FIG. 20 is a top right-side perspective view of the plate shown in FIG. 18;

DETAILED DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific embodiments illustrated in the accompanying drawing figures and described herein is simply exemplary and should not be considered as limiting.

Figure 1:
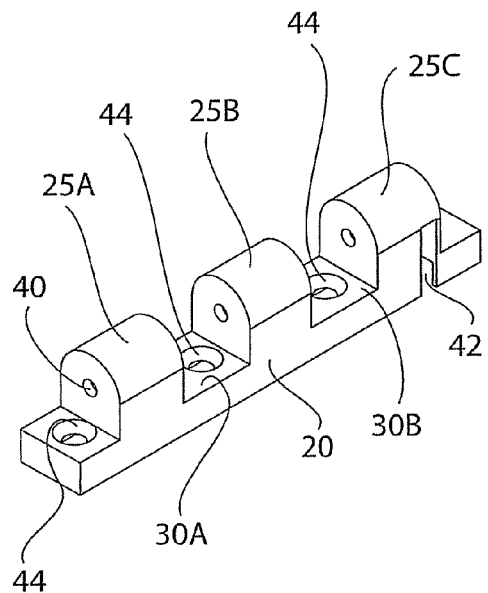
FIG. 1 is a top left-side perspective view of a first mounting plate according to one embodiment of the present invention.
Figure 2:
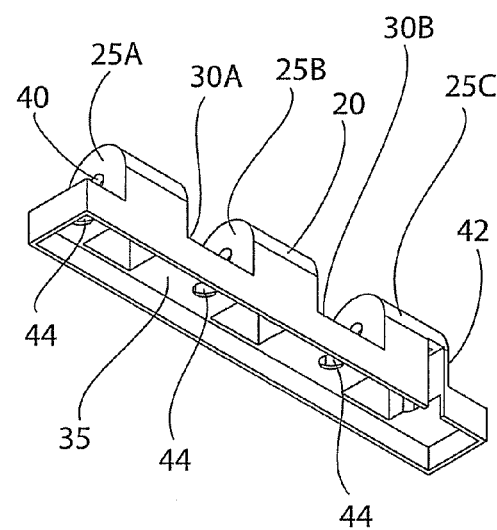
FIG. 2 is a bottom left-side perspective view of the plate shown in FIG. 1.
Figure 3:
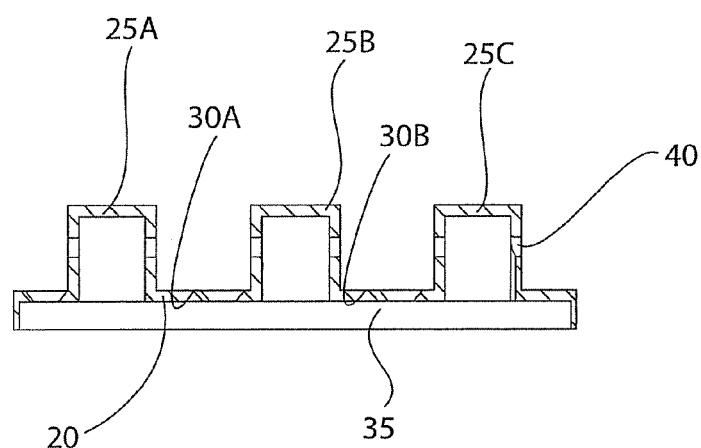
FIG. 3 is a left-side cross-sectional view of the plate shown in FIG. 1.
Figure 10:
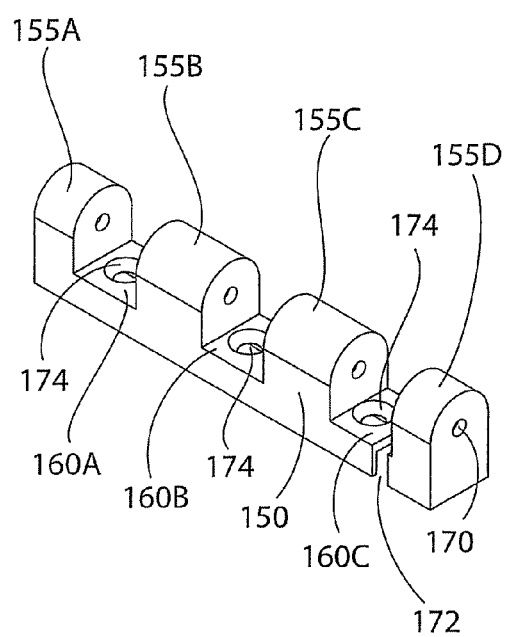
FIG. 10 is a top perspective view of a second mounting plate according to a further embodiment of the present invention.
Figure 11:
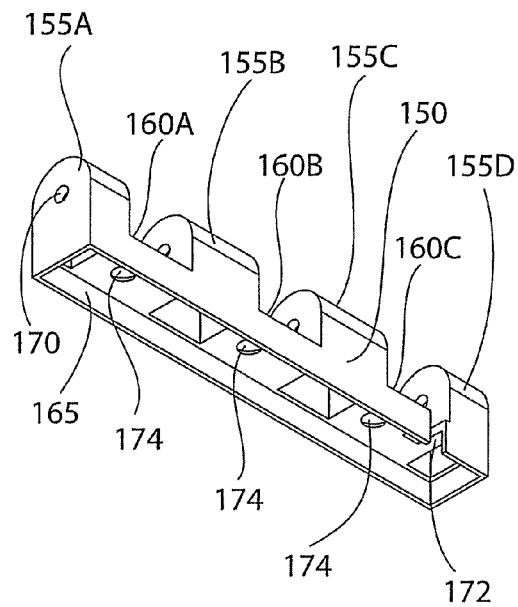
FIG. 11 is a bottom perspective view of the plate shown in FIG. 10.
Figure 12:
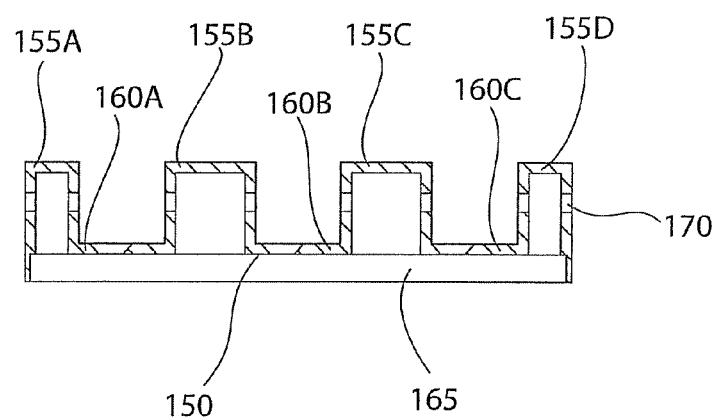
FIG. 12 is a left-side cross-sectional view of the plate shown in FIG. 10.
Figure 13:
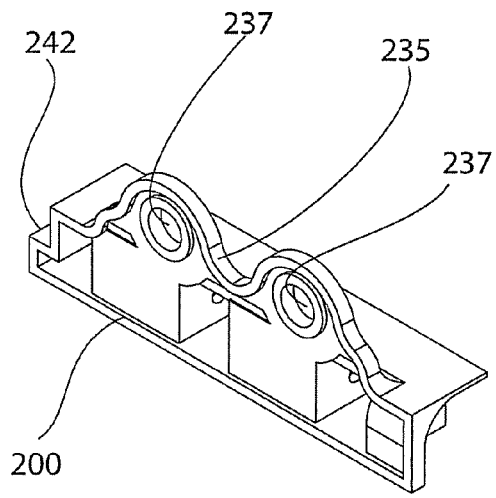
FIG. 13 is a top left-side perspective view of a first mounting plate according to yet another embodiment of the present invention.
Figure 14:
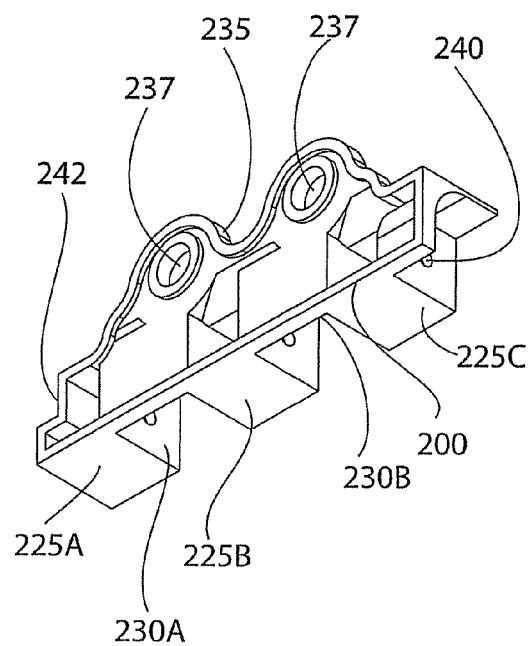
FIG. 14 is bottom left-side perspective view of the plate shown in FIG. 13.
Figure 15:
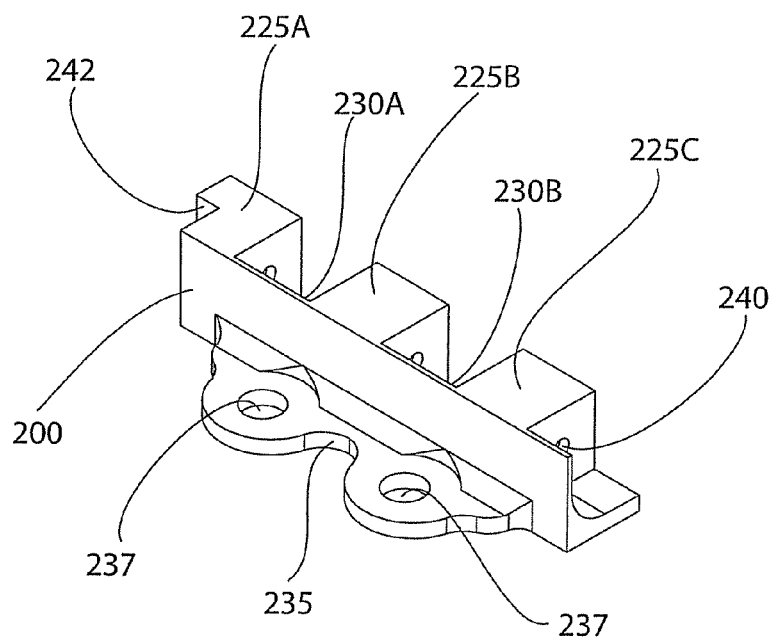
FIG. 15 is a top right-side perspective view of the plate shown in FIG. 13.
Figure 16:
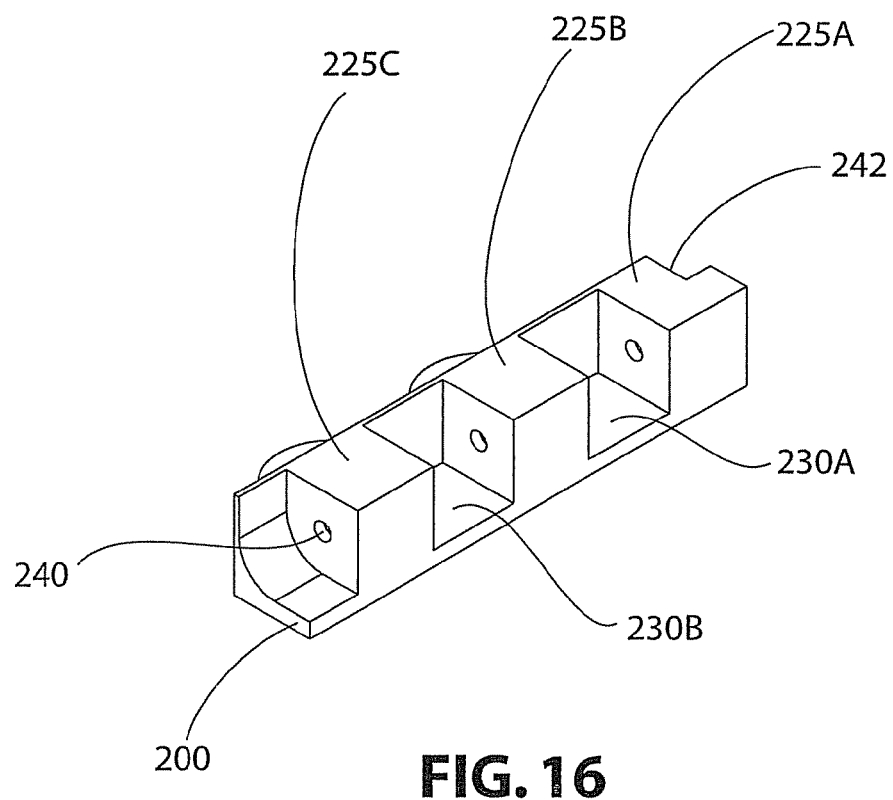
FIG. 16 is a bottom right-side perspective view of the plate shown in FIG. 13.
Figure 17:
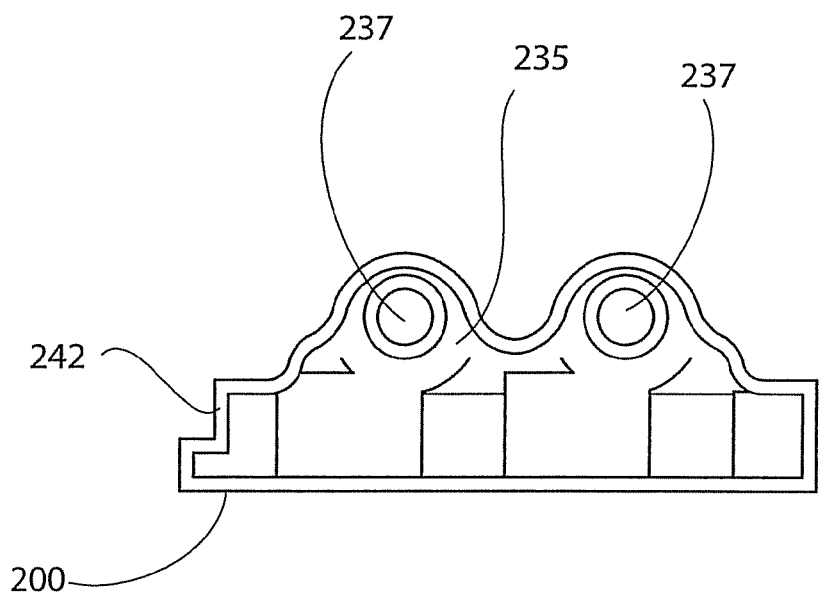
FIG. 17 is a left-side view of the plate shown in FIG. 13.
Figure 21:
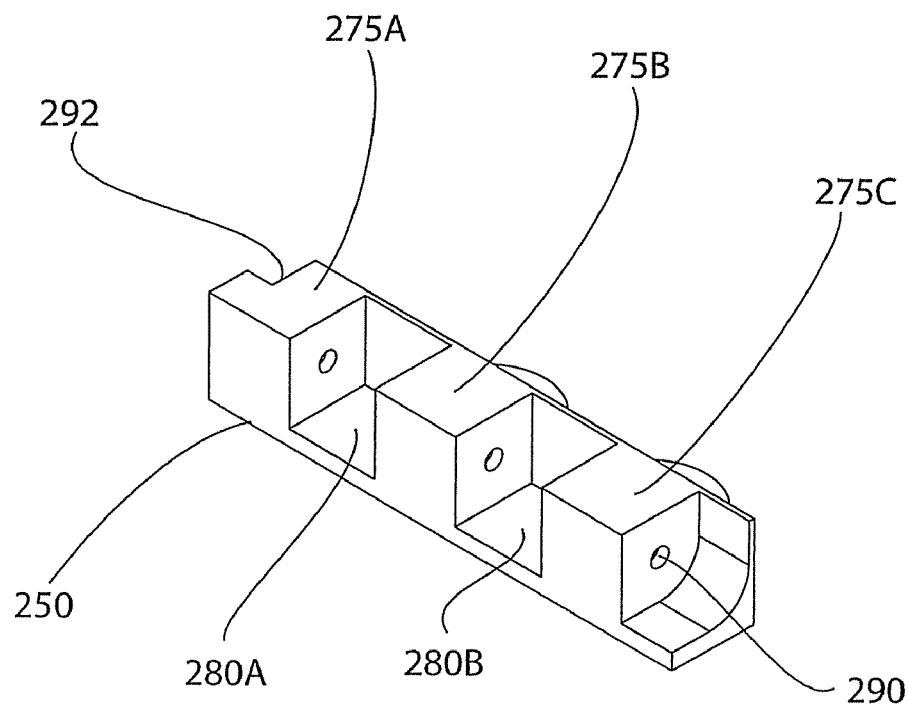
FIG. 21 is a bottom right-side perspective view of the plate shown in FIG. 18.
Figure 22:
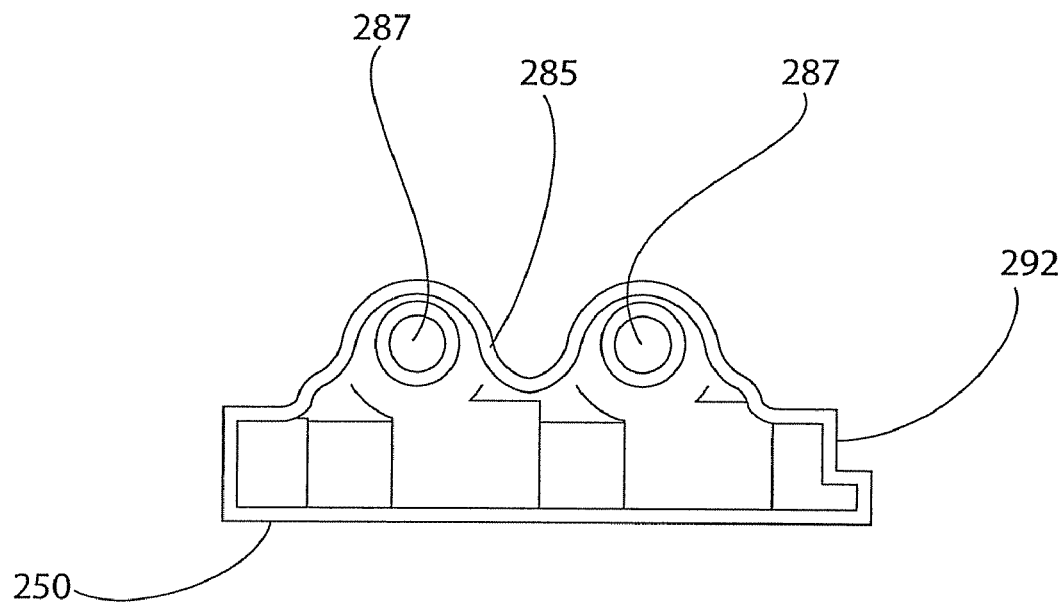
FIG. 22 is a left-side view of the plate shown in FIG. 18.

In one embodiment, shown in FIGS. 1-6, a connector strip includes a first mounting plate 20 and a second mounting plate 50. The first mounting plate 20 has spaced apart first projections 25A, 25B, 25C with first pockets 30A, 30B between adjacent projections 25A, 25B, 25C. The second mounting plate 50 has spaced apart second projections 55A, 55B, 55C, 55D with second pockets 60A, 60B, 60C between the adjacent projections 55A, 55B, 55C, 55D. As shown in FIGS. 3 and 6, the first projections 25A, 25B, 25C and the second projections 55A, 55B, 55C, 55D may be longitudinally spaced apart from one another. The first projections 25A, 25B, 25C and the first pockets 30A, 30B slidingly interlock with the second projections 55A, 55B, 55C, 55D and the second pockets 60A, 60B, 60C to form a joint.

The first mounting plate 20 may have a bore 40 extending through the first projections 25A, 25B, 25C in a longitudinal direction and the second mounting plate 50 may have a bore 70 extending through the second projections 55A, 55B, 55C, 55D in a longitudinal direction. When the first mounting plate 20 is positioned such that the first projections 25A, 25B, 25C and the first pockets 30A, 30B slidingly interlock with the second projections 55A, 55B, 55C, 55D and the second pockets 60A, 60B, 60C, as discussed above, the respective bores 40, 70 will be aligned.

The first mounting plate 20 and the second mounting plate 50 may also include a plurality of mounting holes 44, 74 extending therethrough. For example, as shown in FIGS. 1-3, the first mounting plate 20 may include three counter-sunk mounting holes 44 longitudinally spaced apart. Similarly, as shown in FIGS. 4-6, the second mounting plate 50 may include three counter-sunk mounting holes 74 longitudinally spaced and extending through the area of the second pockets 60A, 60B, 60C. Further, the first and second mounting plates 20, 50 may include receiving portions 35, 65 located on a side opposite the first projections 25A, 25B, 25C and the second projections 55A, 55B, 55C, 55D, respectively.

Additionally, the first mounting plate 20 and the second mounting plate 50 may include grooves 42, 72, respectively. As shown in FIGS. 1 and 2, the groove 42 of the first mounting plate 20 extends in a transverse direction in the area of the first projection 25C. As shown in FIGS. 4 and 5, the groove 72 of the second mounting plate 50 extends in a transverse direction in the area of the second pocket 60A. The grooves 42, 72 will be described in more detail below.

The exterior surfaces of first projections 25A, 25B, 25C and the second projections 55A, 55B, 55C, 55D, illustrated in FIGS. 1-6, have curved profiles such that, when the first projections 25A, 25B, 25C and the first pockets 30A, 30B slidingly interlock with the second projections 55A, 55B, 55C, 55D and the second pockets 60A, 60B, 60C, the first mounting plate 20 and the second mounting plate 50 may rotate relative to one another.

In a further embodiment, shown in FIGS. 7-12, a connector strip includes a first mounting plate 120 and a second mounting plate 150. The first mounting plate 120 has first projections 125A, 125B, 125C, first pockets 130A, 130B, a receiving portion 135, a bore 140, a groove 142, and mounting holes 144 as described above with respect to the first mounting plate 20. The second mounting plate 150 also has second projections 155A, 155B, 155C, 155D, second pockets 160A, 160B, 160C, a receiving portion 165, a bore 170, a groove 172, and mounting holes 174 as described above with respect to the second mounting plate 50. However, the first mounting plate 120, shown in FIGS. 7-9, has a groove 142 that extends in a transverse direction in the area of first projection 125A. Similarly, the second mounting plate 150 has a groove 172 that extends in a transverse direction in the area of the second pocket 160C.

In another embodiment, shown in FIGS. 13-17, a connector strip includes a first mounting plate 200 used in conjunction with the second mounting plate 150 described above and shown in FIGS. 4-6. The first mounting plate 200 has spaced apart first projections 225A, 225B, 225C having a square profile with first pockets 230A, 230B between adjacent projections 225A, 225B, 225C. The first projections 225A, 225B, 225C and the first pockets 230A, 230B slidingly interlock with the second projections 155A, 155B, 155C, 155D and the second pockets 160A, 160B, 160C to form a joint. The first mounting plate 200 may also include a mounting flange 235 having at least one mounting hole 237. For example, as shown in FIGS. 13-17, the mounting flange 235 may include two mounting holes 237.

The first mounting plate 200 may have a bore 240 extending through the first projections 225A, 225B, 225C in a longitudinal direction. When the first mounting plate 200 is positioned such that the first projections 225A, 225B, 225C and the first pockets 230A, 230B slidingly interlock with the second projections 155A, 155B, 155C, 155D and the second pockets 160A, 160B, 160C, the respective bores 240, 70 will be aligned. Further, as shown in FIGS. 13-17, the first mounting plate 200 may include a recess 242 extending in a transverse direction in the area of the first projection 225A.

Referring to FIGS. 18-22, a first mounting plate 250 is shown having substantially the same features as the first mounting plate 200 described above. The first mounting plate 250 may be used in conjunction with the second mounting plate 50 and includes spaced apart first projections 275A, 275B, 275C having a square profile with first pockets 280A, 280B, a mounting flange 285 with mounting holes 287, and a bore 290. The first mounting plate 250, however, has a recess 292 extending in a transverse direction in the area of the first projection 275A, which is positioned at an opposite end in comparison to the recess 242 of the first mounting plate 200. Further, the first mounting plate 250 includes a groove 294 extending in a longitudinal direction in the area of the recess 292.

As discussed above and shown in FIGS. 13-22, the exterior surfaces of first projections 225A, 225B, 225C of first mounting plate 200 and the first projections 275A, 275B, 275C of the first mounting plate 250 have square profiles such that, when first projections 225A, 225B, 225C, 275A, 275B, 275C slidingly interlock with the second projections 55A, 55B, 55C, 55D, 155A, 155B, 155C, 155D and the second pockets 60A, 60B, 60C, 160A, 160B, 160C the first mounting plates 200, 250 may rotate relative to the respective second mounting plates 50, 150. Due to the structure and arrangement of the first mounting plates 200, 250, the second mounting plates 50, 150 may rotate 90° relative to the first mounting plates 200, 250.

Although the mounting plates described above and shown in FIGS. 1-22 include a specific number of projections and pockets, additional projections and pockets or fewer projections and pockets may be preferred when the length of the connecting strip is required to be longer or shorter, respectively. Further, although the projections and the respective pockets shown had a curved or square profile, the projections and pockets may have any suitable shape to allow interlocking of the projections and pockets.

Figure 23:
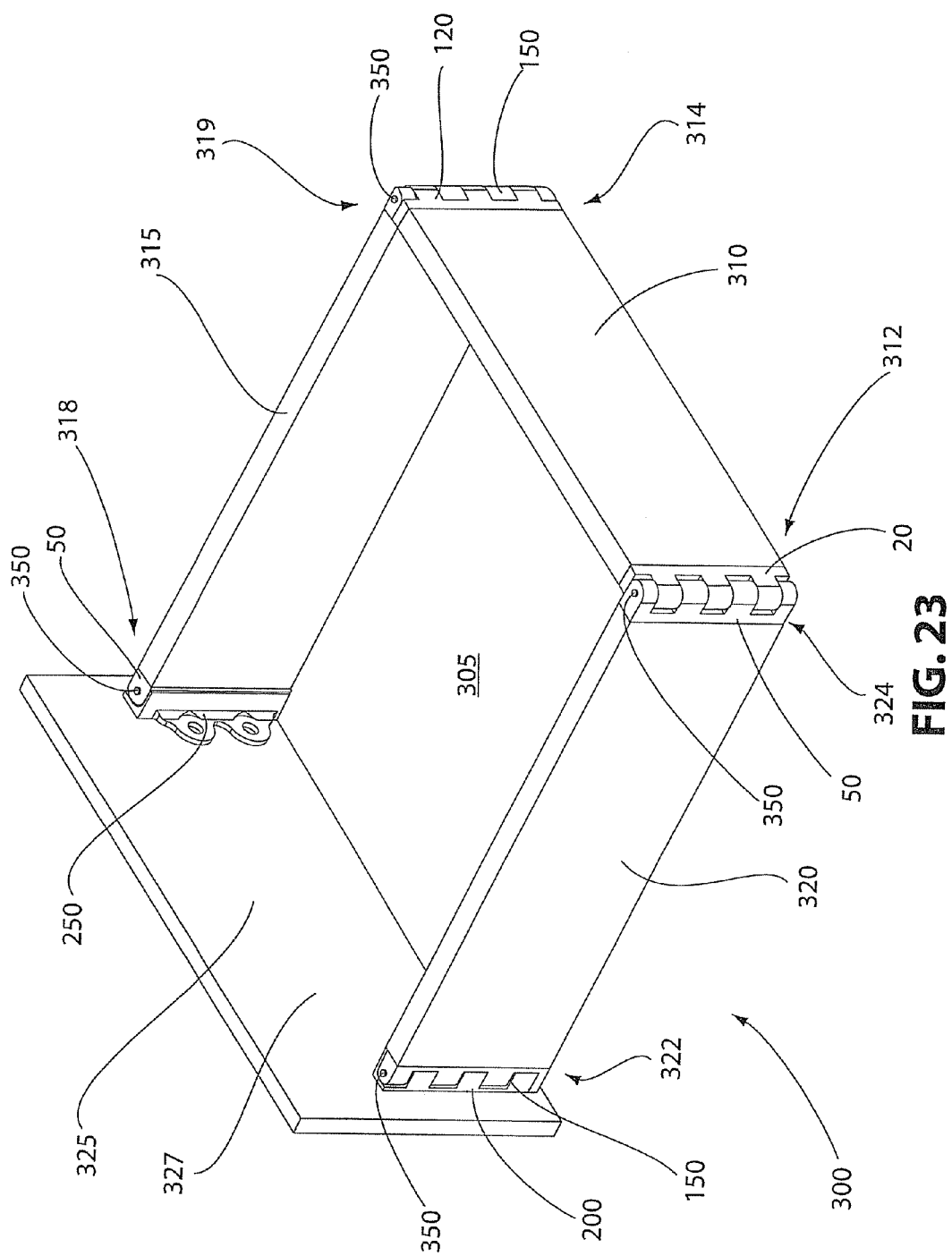
FIG. 23 is a perspective view of a drawer assembly according to one embodiment of the invention.
Figure 24:
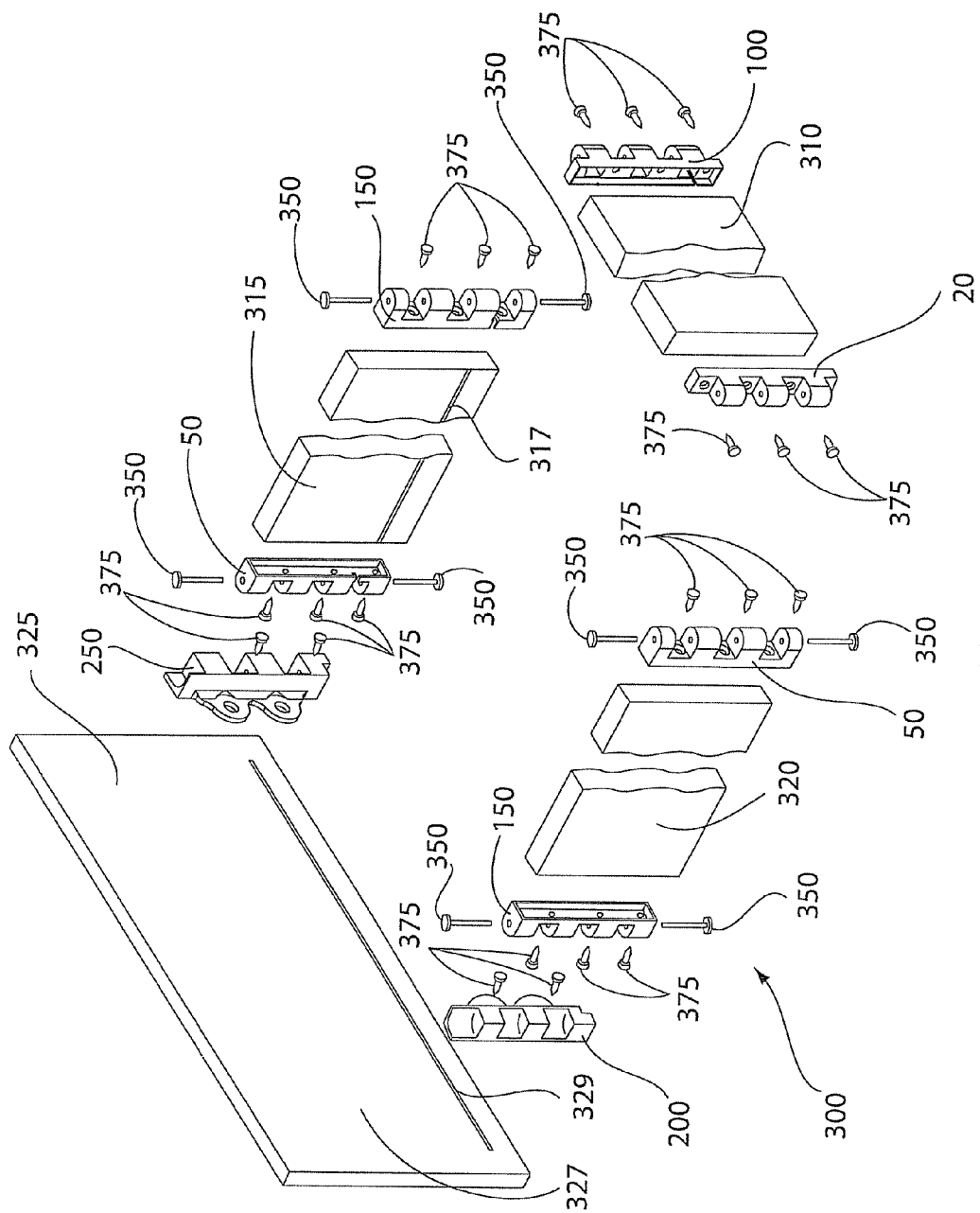
FIG. 24 is an exploded perspective view of the drawer assembly shown in FIG. 23.

In one embodiment, shown in FIGS. 23 and 24, a drawer assembly 300 is disclosed. The drawer assembly 300 includes a bottom panel 305, a rear panel 310 having a first end 312 and a second end 314, a right panel 315 having a first end 318 and a second end 319, a left panel 320 having a first end 322 and a second end 324, and a front panel 325 having a rear face 327. The front panel 325 and the right panel 315 have a support groove 329, 317 positioned at a lower portion of the panels 325, 315 and configured to receive a circumferential edge of the bottom panel 305. Similarly, the rear panel 310 and the left panel 320 have a corresponding support groove (not shown) positioned at a lower portion of the panels 310, 320 and configured to receive a circumferential edge of the bottom panel 305. Thus, the support grooves generally have a height greater than or equal to the thickness of the bottom panel 305.

Referring to FIGS. 23 and 24, the first end 312 of the rear panel 310 is secured to the second end 324 of the left panel 320 via a connecting strip including the first mounting plate 20 and the second mounting plate 50. The second end 314 of the rear panel 310 is secured to the second end 319 of the right panel 315 via a connecting strip including the first mounting plate 120 and the second mounting plate 150. Further, the first end 322 of the left panel 320 is secured to the rear face 327 of the front panel 325 via a connecting strip including the first mounting plate 200 and the second mounting plate 150. The first end 318 of the right panel 315 is secured to the rear face 327 of the front panel 325 via a connecting strip including the first mounting plate 250 and the second mounting plate 50. The circumferential edge of the bottom panel 305 is positioned within the support grooves of the right panel 315, front panel 325, left panel 320 and rear panel 310. Furthermore, the bottom panel 305 is received by the respective grooves 42, 72, 142, 172 and recesses 242, 292 of the first and second mounting plates 20, 50, 120, 150, 200, 250. Thus, when mated, the grooves 42, 72, 142, 172 and recesses 242, 292 of the first and second mounting plates 20, 50, 120, 150, 200, 250 align with each other and also align with the support grooves of the rear panel 310, left panel 320, right panel 315, and front panel 325 to provide a continuous support groove to the bottom panel 305.

With the respective first projections and the first pockets of the first mounting plates 20, 120, 200, 250 interlocked with the respective second projections and the second pockets of the second mounting plates 50, 150, a locking pin 350 is placed within the bores 40, 70, 140, 170, 240, 290 to laterally secure together the projections and pockets associated with the first mounting plates 20, 120, 200, 250 and the second mounting plates 50, 150. Although the bores 40, 70, 140, 170, 240, 290 are shown to extend through all of the respective projections, the bores 40, 70, 140, 170, 240, 290 may only extend through the projections positioned at the ends of the mounting plates. In particular, two locking pins 350 may be used at each connector strip such that one pin 350 can enter from the bottom of the bores and another can enter at the top of the bore.

As shown more clearly in FIG. 24, the first mounting plates 20, 120 and the second mounting plates 50, 150 may be positioned on the ends of the left panel 320, the right panel 315, and the rear panel 310 via the receiving portions 35, 65, 135, 165. The first mounting plates 20, 120 and the second mounting plates 50, 150 can then be secured to the ends of the left panel 320, the right panel 315, and the rear panel 310 via a plurality of fasteners 375 inserted through the respective mounting holes 44, 74, 144, 174. Similarly, the first mounting plates 200 and 250 may be secured to the rear face 327 of the front panel 325 via fasteners 375 inserted through the respective mounting holes 237, 287 of the mounting flanges 235, 285. The fasteners 375 may be screws, nails, or any other suitable securing arrangement.

While the mounting plates described above and shown in FIGS. 1-24 rotate relative to one another, the mounting plates secured to the front panel 325 and the first ends 322, 318 of the left and right panels 320, 315 do not require this feature and may be arranged such that these mounting plates do not rotate relative to one another. Further, the connecting strips may be secured to different parts of a drawer and all of the mounting plates may be non-rotatable relative to one another.

During assembly of the drawer assembly 300, the rear panel 310 may be secured to the second ends 319, 324 of the right and left panels 315, 320 via connector strips formed by mounting plates 20, 50, 120, 150 such that the right and left panels 315, 320 may be rotated outwardly to allow the bottom panel 305 to be inserted into the support groove (not shown) of the rear panel 310. The right and left panels 315, 320 may then be rotated inwardly such that the support groove 317 of the right panel and the support groove (not shown) of the left panel engage the edge of the bottom panel 305. The front panel 325 may then be secured to the first ends 318, 322 of the right and left panels 315, 320 via connector strips formed by mounting plates 50, 150, 200, 250 such that the support groove 329 engages the edge of the bottom panel 305. As discussed above and shown in FIGS. 23 and 24, the projections and pockets of the mounting plates may be laterally secured together by inserting the locking pins 350 through the bores 40, 70, 140, 170, 240, 290.

Although the connector strips are shown and described above with relation to furniture drawers, the use of the interlocking connector strip may be used to secure any other furniture parts so that when assembled, the parts are stronger overall and result in a more robust construction.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A connector strip comprising:
   a first mounting plate having spaced apart first projections with first pockets between adjacent projections;
   a second mounting plate having at least one second projection with second pockets between each adjacent second projection, wherein the first projections and the first pockets slidingly interlock with each second projection and the second pockets to form a joint;
   at least one fastener laterally securing together the interlocking projections and pockets while at the same time permitting rotation therebetween; and
   wherein the first mounting plate includes a mounting flange having at least one mounting hole extending therethrough.

2. The connector strip in accordance with claim 1, wherein the first projection and each second projection have a bore extending therethrough in a longitudinal direction.

3. The connector strip in accordance with claim 2, wherein the at least one fastener extends through the bore of the first projections and the bore of each second projection.

4. The connector strip in accordance with claim 1, wherein the first mounting plate and the second mounting plate each have a plurality of mounting holes extending therethrough.

5. Presented The connector strip according to claim 1, wherein each fastener has a cylindrical shaft and wherein each bore receiving a fastener has a cylindrical profile.

6. A drawer assembly comprising:
   a front panel having a rear face;
   a rear panel having a first end and a second end;
   a left panel having a first end and a second end;
   a right panel having a first end and a second end;
   a bottom panel;
   a first connector strip securing the first end of the rear panel to the second end of the left panel;
   a second connector strip securing the second end of the rear panel to the second end of the right panel;
   a third connector strip securing the first end of the left panel to the rear face of the front panel; and
   a fourth connector strip securing the first end of the right panel to the rear face of the front panel;
   wherein each connector strip comprises:
      a first mounting plate having spaced apart first projections with first pockets between adjacent projections;
      a second mounting plate having at least one second projection with second pockets between each adjacent second projection, wherein the first projections and the first pockets slidingly interlock with each second projection and the second pockets to form a joint;
      at least one fastener laterally securing together the interlocking projections and pockets while at the same time permitting rotation between the rear panel and the left panel and between the rear panel and the right panel; and
   wherein the third connector strip has a mounting flange with mounting holes extending therethrough and, wherein the mounting flange is secured to the rear face of the front panel.

7. The drawer assembly in accordance with claim 6, wherein at least one of the first mounting plate and the second mounting plate of each connector strip has a receiving portion located on a side opposite the first projection and each second projection, the receiving portion being configured to receive the first end and the second end of the left panel, the right panel, and the rear panel, respectively.

8. The drawer in accordance with claim 6, wherein the front panel, rear panel, left panel and right panel each further comprise a mounting groove configured to support a circumferential edge of the bottom panel.

9. The drawer assembly in accordance with claim 8, wherein each connector strip further comprises a groove corresponding to the respective mounting grooves of the front panel, rear panel, left panel and right panel, the groove of each connector strip being configured to support the circumferential edge of the bottom panel.

10. The drawer assembly in accordance with claim 6, wherein the first projection and each second projection of each connector strip have a bore extending therethrough in a longitudinal direction.

11. The drawer assembly in accordance with claim 10, wherein the at least one fastener of each connector strip extends through the bore of the first projections and the bore of each second projection.

12. The drawer assembly in accordance with claim 6, wherein the first mounting plate and the second mounting plate of each connector strip have a plurality of mounting holes extending therethrough.

13. The drawer assembly in accordance with claim 12, wherein a plurality of fasteners positioned through the mounting holes secure the first mounting plate and the second mounting plate of each connector strip to the front panel, rear panel, left panel and right panel, respectively.

14. The drawer assembly according to claim 6, wherein each fastener has a cylindrical shaft and wherein each bore receiving a fastener has a cylindrical profile.

15. A method of assembling a drawer comprising the steps of:
   providing a front panel having a rear face, a rear panel having a first end and a second end, a left panel having a first end and a second end, a right panel having a first end and a second end, and a bottom panel;
   securing the first end and the second end of the rear panel to the second end of the left panel and the second end of the right panel, respectively, via first and second connector strips; and
   securing the first end of the left panel and the first end of the right panel to the rear face of the front panel via third and fourth connector strips,
   wherein each connector strip comprises:
      a first mounting plate having spaced apart first projections with first pockets between adjacent projections;
      a second mounting plate having at least one second projection with second pockets between each adjacent second projection, wherein the first projections and the first pockets slidingly interlock with each second projection and the second pockets to form a joint;
      at least one fastener laterally securing together the interlocking projections and pockets while at the same time permitting rotation between the rear panel and the left panel and between the rear panel and the right panel; and wherein the third connector strip has a mounting flange which is secured to the rear face of the front panel.

16. The method of assembling a drawer in accordance with claim 15, wherein the front panel, rear panel, left panel and right panel each further comprise a mounting groove configured to support a circumferential edge of the bottom panel.

17. The method of assembling a drawer in accordance with claim 16, wherein each connector strip further comprises a groove corresponding to the respective mounting grooves of the front panel, rear panel, left panel and right panel, the groove of each connector strip configured to support the circumferential edge of the bottom panel.

18. The method of assembling a drawer in accordance with claim 17, the method further comprising the step of positioning the circumferential edge of the bottom panel into the respective mounting grooves of the front panel, rear panel, left panel and right panel and the respective grooves of each connector strip.

19. The method of assembling a drawer in accordance with claim 15, wherein the first projection and each second projection of each connector strip have a bore extending therethrough in a longitudinal direction.

20. The method of assembling a drawer in accordance with claim 19, wherein the at least one fastener of each connector strip extends through the bore of the first projections and the bore of each second projection.

21. The method of assembling a drawer in accordance with claim 15, wherein the first mounting plate and the second mounting plate of each connector strip have a plurality of mounting holes extending therethrough.

22. The method of assembling a drawer in accordance with claim 21, further comprising the step of securing the first mounting plate and the second mounting plate of each connector strip to the front panel, rear panel, left panel and right panel, respectively, via a plurality of fasteners inserted through the mounting holes.

23. The method of assembling a drawer according to claim 15, wherein each fastener has a cylindrical shaft and wherein each bore receiving a fastener has a cylindrical profile.

* * * * *

UNITED STATES PATENT AND TRADEMARK OFFICE
CERTIFICATE OF CORRECTION

| | | |
|---|---|---|
| PATENT NO. | : 8,147,012 B2 | Page 1 of 1 |
| APPLICATION NO. | : 12/209680 | |
| DATED | : April 3, 2012 | |
| INVENTOR(S) | : John M. Green | |

It is certified that error appears in the above-identified patent and that said Letters Patent is hereby corrected as shown below:

Column 7, Line 37, Claim 5, delete "Presented The" and insert -- The --

Column 8, Line 13, Claim 8, delete "drawer" and insert -- drawer assembly --

Signed and Sealed this
Seventeenth Day of July, 2012

David J. Kappos
*Director of the United States Patent and Trademark Office*